(12) United States Patent
Ojo et al.

(10) Patent No.: US 8,923,780 B2
(45) Date of Patent: Dec. 30, 2014

(54) METHOD AND SYSTEM FOR SHARING LOW NOISE AMPLIFIER CIRCUITRY IN A SINGLE CHIP BLUETOOTH AND WIRELESS LOCAL AREA NETWORK

(75) Inventors: Adedayo Ojo, San Diego, CA (US); Bojko Marholev, Irvine, CA (US); Shahla Khorram, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1561 days.

(21) Appl. No.: 11/622,551

(22) Filed: Jan. 12, 2007

(65) Prior Publication Data
US 2008/0139151 A1   Jun. 12, 2008

Related U.S. Application Data

(60) Provisional application No. 60/868,818, filed on Dec. 6, 2006.

(51) Int. Cl.
| | |
|---|---|
| H04B 1/44 | (2006.01) |
| H04B 1/40 | (2006.01) |
| H04W 88/06 | (2009.01) |

(52) U.S. Cl.
CPC .............. *H04B 1/406* (2013.01); *H04W 88/06* (2013.01)
USPC ............... 455/78; 455/73; 455/311; 455/334; 455/234.1; 455/132

(58) Field of Classification Search
USPC .......... 455/132, 133, 138, 234.1, 311, 552.1, 455/41.1, 39, 422.1, 333–335, 323, 324, 455/553.1, 78, 73; 370/338, 339
See application file for complete search history.

(56) References Cited

U.S. PATENT DOCUMENTS

| | | | | |
|---|---|---|---|---|
| 7,266,361 B2 * | 9/2007 | Burdett | ......................... | 455/334 |
| 7,283,840 B2 * | 10/2007 | Cho | ........................... | 455/552.1 |
| 7,333,830 B2 * | 2/2008 | Malone | ...................... | 455/552.1 |
| 7,991,369 B2 * | 8/2011 | Nutt | .............................. | 455/130 |

(Continued)

FOREIGN PATENT DOCUMENTS

| | | |
|---|---|---|
| CN | 1706107 | 12/2005 |
| WO | 2004/036777 | 4/2004 |

OTHER PUBLICATIONS

European Search Report for European Patent Application No. 07013399.6-2411, dated Jan. 15, 2010.

*Primary Examiner* — Kamran Afshar
*Assistant Examiner* — Mong-Thuy Tran
(74) *Attorney, Agent, or Firm* — McDermott Will & Emery LLP

(57) ABSTRACT

Aspects of a method and system for sharing low noise amplifier (LNA) circuitry in a single chip Bluetooth and wireless local area network (WLAN) system are disclosed. Aspects of the system may comprise a chip with integrated WLAN and Bluetooth radios. RF signals may be received via a single antenna coupled to a shared LNA integrated in chip. When WLAN signals are received they are communicated from the shared LNA to a subsequent amplification stage integrated within the WLAN radio. When Bluetooth signals are received they are communicated from the shared LNA to a subsequent amplification stage that comprises a transconductance amplifier integrated within the WLAN radio and an LNA load integrated within the Bluetooth radio. Gains in the LNAs, the transconductance amplifier, and/or the subsequent WLAN amplification stage may be dynamically adjusted. Outputs from the subsequent amplification stages may be communicated to mixers for further processing.

25 Claims, 5 Drawing Sheets

(56) References Cited

U.S. PATENT DOCUMENTS

| | | | |
|---|---|---|---|
| 8,428,512 B2 * | 4/2013 | Ibrahim et al. | 455/41.2 |
| 2004/0162023 A1 * | 8/2004 | Cho | 455/41.1 |
| 2006/0068837 A1 | 3/2006 | Malone | |
| 2006/0199562 A1 * | 9/2006 | Taylor | 455/333 |
| 2006/0252403 A1 * | 11/2006 | Garcia | 455/334 |
| 2007/0207752 A1 * | 9/2007 | Behzad | 455/132 |
| 2008/0051134 A1 * | 2/2008 | Brobston et al. | 455/553.1 |
| 2008/0123610 A1 * | 5/2008 | Desai et al. | 370/339 |

* cited by examiner

METHOD AND SYSTEM FOR SHARING LOW NOISE AMPLIFIER CIRCUITRY IN A SINGLE CHIP BLUETOOTH AND WIRELESS LOCAL AREA NETWORK

CROSS-REFERENCE TO RELATED APPLICATIONS/INCORPORATION BY REFERENCE

This application makes reference to, claims priority to, and claims the benefit of U.S. Provisional Application Ser. No. 60/868,818, filed on Dec. 6, 2006.

The above stated application is hereby incorporated herein by reference in its entirety.

FIELD OF THE INVENTION

Certain embodiments of the invention relate to electronic power amplification. More specifically, certain embodiments of the invention relate to a method and system for sharing low noise amplifier (LNA) circuitry in a single chip Bluetooth and wireless local area network (WLAN) system.

BACKGROUND OF THE INVENTION

As mobile, wireless, and/or handheld portable devices increasingly become multifunctional, "all-in-one," communication devices, these handheld portable devices integrate an increasingly wide range of functions for handling a plurality of wireless communication services. For example, a single handheld portable device may enable Bluetooth communications and wireless local area network (WLAN) communications.

Much of the front end processing for wireless communications services is performed in analog circuitry. Front end processing within a portable device may comprise a range of operations that involve the reception of radio frequency (RF) signals, typically received via an antenna that is communicatively coupled to the portable device. Receiver tasks performed on an RF signal may include demodulation, filtering, and analog-to-digital conversion (ADC), for example. Noise considerations may be important since the strength of the received RF signal may be low. The resulting front-end processed signal may be referred to as a baseband signal. The baseband signal typically contains digital data, which may be subsequently processed in digital circuitry within the portable device.

Front end processing within a portable device may also include transmission of RF signals. Transmitter tasks performed on a baseband signal may include digital-to-analog conversion (DAC), filtering, modulation, and power amplification (PA), for example. The power amplified, RF signal, is typically transmitted via an antenna that is communicatively coupled to the portable device by some means. The antenna utilized for receiving an RF signal at a portable device may or may not be the same antenna that is utilized for transmitting an RF signal from the portable device.

One limitation in the inexorable march toward increasing integration of wireless communications services in a single portable device is that the analog RF circuitry for each separate wireless communication service may be implemented in a separate integrated circuit (IC) device (or chip). This may result in a number of disadvantages and/or limitations in such portable devices. For example, the increasing chip count may limit the extent to which the physical dimensions of the portable device may be miniaturized. Thus, the increasing integration may result in physically bulky devices, which may be less appealing to consumer preferences. The chip count may be further increased due to the need to replicate ancillary circuitry associated with each RF IC. For example, each RF IC may require separate low noise amplifier (LNA) circuitry, separate PA circuitry, and separate crystal oscillator (XO) circuitry for generation of clocking and timing signals within each RF IC. Similar replication may occur for digital IC devices utilized for processing of baseband signals from each separate wireless communication service.

Along with an increasing IC component count, there may also be a corresponding rise in power consumption within the portable device. This may present another set of disadvantages, such as increased operating temperature, and reduced battery life between recharges.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for sharing low noise amplifier (LNA) circuitry in a single chip Bluetooth and wireless local area network (WLAN) system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for sharing low noise amplifier (LNA) circuitry in a single chip Bluetooth and wireless local area network (WLAN) system. Aspects of the system may comprise a chip with integrated WLAN and Bluetooth radios. RF signals may be received via a single antenna coupled to a shared low noise amplifier (LNA) integrated in chip. When WLAN signals are received they are communicated from the shared LNA to a subsequent WLAN amplification stage integrated within the WLAN radio. When Bluetooth signals are received they are communicated from the shared LNA to a subsequent Bluetooth amplification stage that comprises a transconductance amplifier integrated within the WLAN radio and an LNA load integrated within the Bluetooth radio. The LNA load may comprise cascade devices, an inductor, and a switched capacitor array, for example. Gains in the LNAs including, for example, shared LNAs, the cascaded transconductance amplifier and LNA load, and/or the subsequent WLAN LNA amplification stage may be dynamically adjusted. Outputs from the subsequent amplification stages may be communicated to mixers for further processing.

Figure 1:
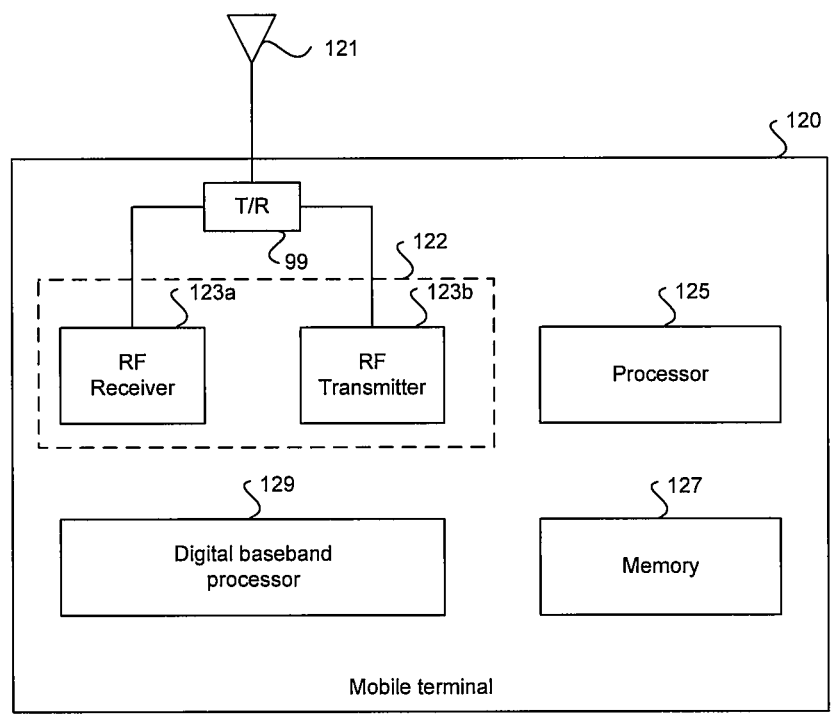
FIG. 1 is a block diagram illustrating and exemplary mobile terminal, in accordance with an embodiment of the invention.

FIG. 1 is a block diagram illustrating and exemplary mobile terminal that comprises a single chip WLAN and Bluetooth radio, in accordance with an embodiment of the invention. Referring to FIG. 1, there is shown a wireless terminal 120 that may comprise an RF receiver 123a, an RF transmitter 123b, a digital baseband processor 129, a processor 125, and a memory 127. The wireless terminal 120 may enable communicating via a wireless local area network (WLAN) and a Bluetooth network. In an embodiment of the invention, the RF receiver 123a and the RF transmitter 123b may be integrated into a single RF transceiver 122, for example. The RF receiver 123a and the RF transmitter 123b may be integrated into a single chip that comprises a WLAN radio and a Bluetooth radio, for example. The single chip comprising WLAN and Bluetooth radios may be implemented utilizing a single CMOS substrate, for example.

A single transmit and receive antenna 121 may be communicatively coupled to the RF receiver 123a and the RF transmitter 123b. In this regard, the single transmit and receive antenna 121 may enable WLAN and Bluetooth transmission and/or reception, for example. A switch or other device having switching capabilities may be coupled between the RF receiver 123a and RF transmitter 123b, and may be utilized to switch the antenna between transmit and receive functions. The wireless terminal 120 may be operated in a system, such as a Wireless Local Area Network (WLAN), a cellular network, a digital video broadcast network, and/or a Wireless Personal Area Network (WPAN) such as a Bluetooth network, for example. In this regard, the wireless terminal 120 may support a plurality of wireless communication protocols, including the IEEE 802.11g/n standard specifications for WLAN networks.

The RF receiver 123a may comprise suitable logic, circuitry, and/or code that may enable processing of received RF signals. The RF receiver 123a may enable receiving RF signals in a plurality of frequency bands in accordance with the wireless communications protocols that may be supported by the wireless terminal 120. Each frequency band supported by the RF receiver 123a may have a corresponding front-end circuit for handling low noise amplification and down conversion operations, for example. In this regard, the RF receiver 123a may be referred to as a multi-band receiver when it supports more than one frequency band. In another embodiment of the invention, the wireless terminal 120 may comprise more than one RF receiver 123a, wherein each of the RF receiver 123a may be a single-band or a multi-band receiver. The RF receiver 123a may be implemented on a chip. In an embodiment of the invention, the RF receiver 123a may be integrated with the RF transmitter 123b on a chip to comprise an RF transceiver, for example. In another embodiment of the invention, the RF receiver 123a may be integrated on a chip with more than one component in the wireless terminal 120.

The RF receiver 123a may quadrature down convert the received RF signal to a baseband frequency signal that comprises an in-phase (I) component and a quadrature (Q) component. The RF receiver 123a may perform direct down conversion of the received RF signal to a baseband frequency signal, for example. In some instances, the RF receiver 123a may enable analog-to-digital conversion of the baseband signal components before transferring the components to the digital baseband processor 129. In other instances, the RF receiver 123a may transfer the baseband signal components in analog form.

The digital baseband processor 129 may comprise suitable logic, circuitry, and/or code that may enable processing and/or handling of baseband frequency signals. In this regard, the digital baseband processor 129 may process or handle signals received from the RF receiver 123a and/or signals to be transferred to the RF transmitter 123b, when the RF transmitter 123b is present, for transmission to the network. The digital baseband processor 129 may also provide control and/or feedback information to the RF receiver 123a and to the RF transmitter 123b based on information from the processed signals. The digital baseband processor 129 may communicate information and/or data from the processed signals to the processor 125 and/or to the memory 127. Moreover, the digital baseband processor 129 may receive information from the processor 125 and/or to the memory 127, which may be processed and transferred to the RF transmitter 123b for transmission to the network. In an embodiment of the invention, the digital baseband processor 129 may be integrated on a chip with more than one component in the wireless terminal 120.

The RF transmitter 123b may comprise suitable logic, circuitry, and/or code that may enable processing of RF signals for transmission. The RF transmitter 123b may enable transmission of RF signals in a plurality of frequency bands. Each frequency band supported by the RF transmitter 123b may have a corresponding front-end circuit for handling amplification and up conversion operations, for example. In this regard, the RF transmitter 123b may be referred to as a multi-band transmitter when it supports more than one frequency band. In another embodiment of the invention, the wireless terminal 120 may comprise more than one RF transmitter 123b, wherein each of the RF transmitter 123b may be a single-band or a multi-band transmitter. The RF transmitter 123b may be implemented on a chip. In an embodiment of the invention, the RF transmitter 123b may be integrated with the RF receiver 123a on a chip to comprise an RF transceiver, for example. In another embodiment of the invention, the RF transmitter 123b may be integrated on a chip with more than one component in the wireless terminal 120.

The RF transmitter 123b may quadrature up convert the baseband frequency signal comprising I/Q components to an RF signal. The RF transmitter 123b may perform direct up conversion of the baseband frequency signal to a baseband frequency signal, for example. In some instances, the RF transmitter 123b may enable digital-to-analog conversion of the baseband signal components received from the digital baseband processor 129 before up conversion. In other instances, the RF transmitter 123b may receive baseband signal components in analog form.

The processor 125 may comprise suitable logic, circuitry, and/or code that may enable control and/or data processing operations for the wireless terminal 120. The processor 125 may be utilized to control at least a portion of the RF receiver 123a, the RF transmitter 123b, the digital baseband processor 129, and/or the memory 127. In this regard, the processor 125 may generate at least one signal for controlling operations within the wireless terminal 120. The processor 125 may also enable executing of applications that may be utilized by the wireless terminal 120. For example, the processor 125 may generate at least one control signal and/or may execute applications that may enable current and proposed WLAN communications and/or Bluetooth communications in the wireless terminal 120.

The memory 127 may comprise suitable logic, circuitry, and/or code that may enable storage of data and/or other information utilized by the wireless terminal 120. For example, the memory 127 may be utilized for storing processed data generated by the digital baseband processor 129 and/or the processor 125. The memory 127 may also be utilized to store information, such as configuration information, that may be utilized to control the operation of at least one block in the wireless terminal 120. For example, the memory 127 may comprise information necessary to configure the RF receiver 123a for receiving WLAN and/or Bluetooth signals in the appropriate frequency band.

Figure 2:
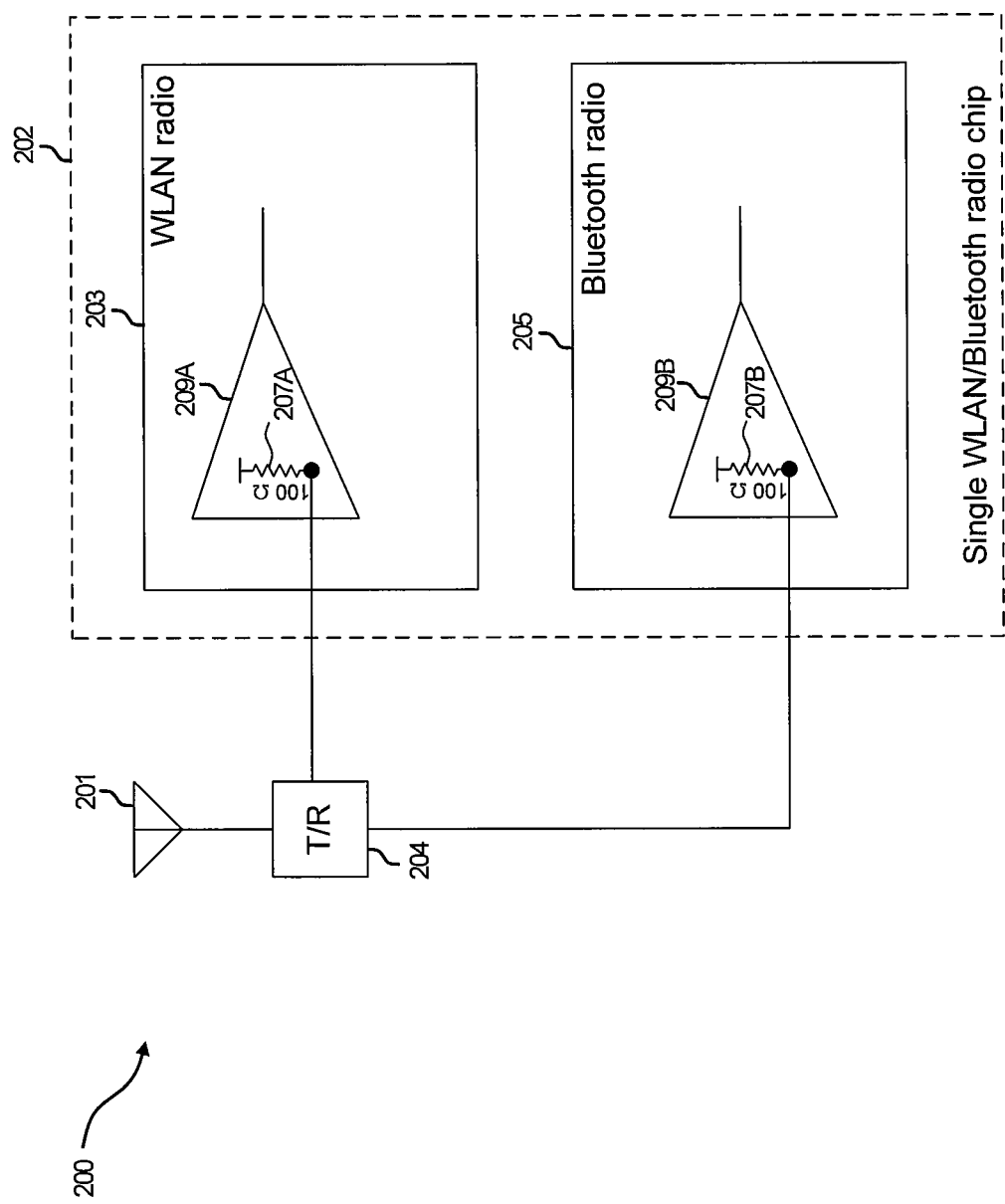
FIG. 2 is a block diagram illustrating parallel receiving paths in a single chip comprising WLAN and Bluetooth radios, in accordance with an embodiment of the invention.

FIG. 2 is a block diagram illustrating parallel receiving paths in a single chip comprising WLAN and Bluetooth radios, in accordance with an embodiment of the invention. Referring to FIG. 2, there is shown an exemplary portion 200 of the wireless terminal 120 that comprises a single antenna 201, a transmit/receive (T/R) switch 204, and a radio chip 202. The radio chip 202 may comprise a WLAN radio 203 and a Bluetooth radio 205. The radio chip 202 may provide RF signal transmission and reception operations for Bluetooth and WLAN signals via the T/R switch 204. In this regard, the radio chip 202 may perform at least a portion of the operations supported by the RF receiver 123a and/or the RF transmitter 123b disclosed in FIG. 1.

The WLAN radio 203 may comprise a low noise amplifier (LNA) 209A that may comprise suitable logic and/or circuitry for amplification of a signal received via the single antenna 201 and through the T/R switch 204. The Bluetooth radio 205 may comprise suitable logic and/or circuitry that may enable amplification of a signal received via the single antenna 201 and through the T/R switch 204. The configuration shown in FIG. 2 may correspond to that of parallel receiving paths with a first parallel path resulting in a portion of the received signal power being communicated to the WLAN radio 203 and a second parallel path resulting in a remaining portion of the received signal power being communicated to the Bluetooth radio 205. Also shown in FIG. 2 are the impedance or load values for the LNAs 209A and 209B. For example, for the LNA 209A in the WLAN radio 203 the input impedance 207A may be approximately 100Ω. Similarly, for the Bluetooth radio 205, the input impedance 207B may be approximately 100 Ω.

In operation, when a signal is received via the single antenna 201, a portion of the received signal may be communicated to the LNA 209A in the WLAN radio 203 and a remaining portion may be communicated to the Bluetooth radio 205. Since the input impedances to the LNAs are approximately the same, the received signal power may be divided between the WLAN radio 203 and Bluetooth radio 205. In this regard, implementing parallel receiving paths in the radio chip 202 for the WLAN radio and the Bluetooth radio may significantly reduce the strength of the signal that is received at the input of the first amplification stage that is provided by the integrated LNAs.

Figure 3:
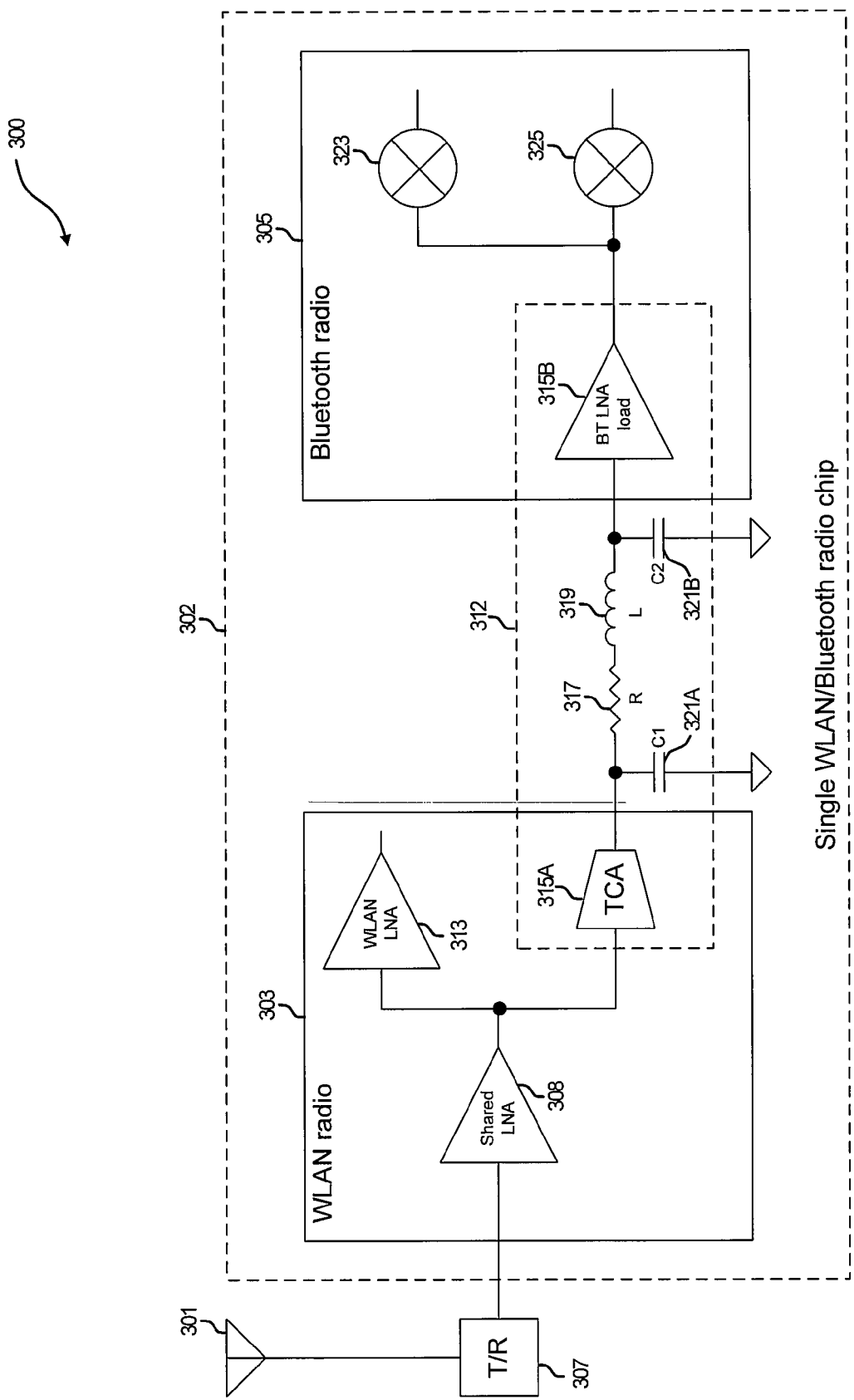
FIG. 3 is a block diagram illustrating a shared LNA circuitry for receiving WLAN and Bluetooth signals via a single antenna, in accordance with an embodiment of the invention.

FIG. 3 is a block diagram illustrating a shared LNA circuitry for receiving WLAN and Bluetooth signals via a single antenna, in accordance with an embodiment of the invention. Referring to FIG. 3, there is shown an exemplary portion 300 of the wireless terminal 120 that comprises a single antenna 301, a transmit/receive (T/R) switch 307, and a radio chip 302. The radio chip 302 may comprise a WLAN radio 303 and a Bluetooth radio 305. The radio chip 302 may provide RF signal transmission and reception operations for Bluetooth and WLAN signals. In this regard, the radio chip 302 may perform at least a portion of the operations supported by the RF receiver 123a and/or the RF transmitter 123b disclosed in FIG. 1.

The WLAN radio 303 may comprise suitable logic, circuitry, and/or code that may enable transmission and/or reception of RF signals. The WLAN radio 303 may comprise a shared LNA 308, a WLAN LNA 313, and a transconductance amplifier (TCA) 315A. The shared LNA 308 may comprise suitable logic and/or circuitry for amplification of signals received via the single antenna 201 through the T/R switch 307. The shared LNA 308 may be integrated into a portion of the radio chip 302 that corresponds to a WLAN radio. The T/R switch 307 may comprise suitable logic, circuitry, and/or code that may enable utilizing a single antenna for transmission and/or reception of signals by the wireless terminal 120. The shared LNA 308 may provide a first amplification stage or first level of amplification for both WLAN and Bluetooth signals, received via the single antenna 301. The WLAN LNA 313 may comprise suitable logic, circuitry, and/or code that may enable further amplification of WLAN signals. The WLAN LNA 313 may correspond to a second or subsequent amplification stage or second level of amplification for WLAN signals after the first amplification stage that is provided by the shared LNA 308. Like the shared LNA 308, the WLAN LNA 313 may also be integrated into a portion of the radio chip 302 that corresponds to a WLAN radio. The output of the WLAN LNA 313 may be communicated to other portions of the WLAN radio 303, such as frequency mixers, for example, for further processing of the WLAN signals.

The TCA 315A in combination with the BT LNA Load 315B on the Bluetooth radio 305 may provide a second level of amplification or second amplification stage 312 for Bluetooth signals after the first level of amplification provided by the shared LNA 308. The TCA 315A may be integrated into a portion of the radio chip 302 that corresponds to a Bluetooth radio. The TCA 315A may comprise suitable logic and/or circuitry that may enable voltage-to-current conversion of Bluetooth signals received from the shared LNA 308. The output of the TCA 315A may be communicated to the Bluetooth radio 305 via a transmission line connection or trace. The connection or trace may be illustrated by an RLC transmission line pi-model that comprises parasitic components such as resistance (R) 317, inductance (L) 319, capacitance (C1) 321A, and capacitance (C2) 321B, for example.

In an embodiment of the invention, the gain of the shared LNA 308, the WLAN LNA 313, and/or the combination of the TCA 315A and the BT LNA load 315B may be dynamically adjusted. In this regard, the BT LNA load 315B may provide the dynamic gain control capability and may also provide channel frequency programmability via variable capacitors. For example, the processor 125 and/or the digital baseband processor 129 disclosed in FIG. 1 may be utilized to determine whether a gain needs adjustment and to generate the appropriate control signals to implement any adjustment that may be necessary. Moreover, the shared LNA 308, the WLAN LNA 313, and/or the TCA 315A may be enabled or disabled in accordance with the operations of the WLAN radio 303. For example, components within the WLAN radio 303 may be disabled when not in use in order to reduce power consumption. The shared LNA 308, the WLAN LNA 313, and/or the TCA 315A may be implemented by utilizing more than one stage, for example.

The Bluetooth radio 305 may comprise a Bluetooth (BT) LNA load 315B. The BT LNA load 315B may comprise suitable logic and/or circuitry that provides current to voltage conversion which in combination with the operation of the TCA 315A enables amplification of Bluetooth signals received from shared LNA 308. The BT LNA load 315B may utilize cascade devices, at least one inductor, and a switched/variable capacitor array, for example. The second level of amplification or second amplification stage 312 for Bluetooth signals may be provided by the TCA 315A integrated within the WLAN radio 303 and the BT LNA load 315B integrated within the Bluetooth radio 305. In this regard, the combined operation of the TCA 315A and the BT LNA load 315B may be substantially the same as that of a low noise amplifier. The output of the BT LNA load 315B may be communicated to other portions of the Bluetooth radio 305, such as the frequency mixers 323 and 325, for example, for further processing of the Bluetooth signals.

Since the shared LNA 308 drives both the second amplification level for the WLAN signals and for the Bluetooth signals, if the second amplification level or stage for the Bluetooth signals, that is the TCA 315A and the BT LNA load 315B, was placed on the Bluetooth radio then the shared LNA 308 may have to drive the output voltages over a long transmission line which may result in significant signal loss. A long transmission line may also present too large a capacitive loading to inductances in the shared LNA 308. By placing the TCA 315A of a corresponding Bluetooth low noise amplification in the WLAN radio, the shared LNA 308 may have a much reduced load. The TCA 315A may then be utilized to drive the long transmission line to the Bluetooth radio 305 into the BT LNA load 315B. This approach may significantly reduce the power consumption of the shared LNA 308 as may be specified by design requirements.

In an embodiment of the invention, the BT LNA load 315B may be enabled or disabled in accordance with the operations of the Bluetooth radio 305. For example, components within the Bluetooth radio 305 may be disabled when not in use in order to reduce power consumption. The BT LNA load 315B may be implemented by utilizing more than one stage, for example.

In operation, RF signals may be received via the single antenna 301 and through the T/R switch 307. The received RF signals may be first amplified by the shared LNA 308 in the WLAN radio 303 within the radio chip 302. In this regard, the shared LNA 308 may provide the first amplification stage to WLAN and Bluetooth signals. The configuration shown in FIG. 3 may differ from the parallel receiving paths disclosed in FIG. 2 in that there need not be a signal strength reduction since the received RF signals are communicated to a single LNA for a first amplification stage.

After the first amplification stage, WLAN signals may be amplified by the WLAN LNA 313. In this regard, the path provided by the TCA 315A and the BT LNA load 315B for subsequent amplification of Bluetooth signals may be disabled, for example. After a second amplification stage is provided to WLAN signals by the WLAN LNA 313, the WLAN signals may be communicated to other portions of the WLAN radio 303 for further processing.

Similarly, after the first amplification stage, Bluetooth signals may be amplified by a second amplification stage 312 that comprises the TCA 315A and the BT LNA load 315B. In this regard, the path provided by the WLAN LNA 313 for subsequent amplification of WLAN signals may be disabled, for example. After a second amplification of the Bluetooth signals is provided by the second amplification stage 312, the Bluetooth signals may be communicated to other portions of the Bluetooth radio 305 for further processing.

Figure 4:
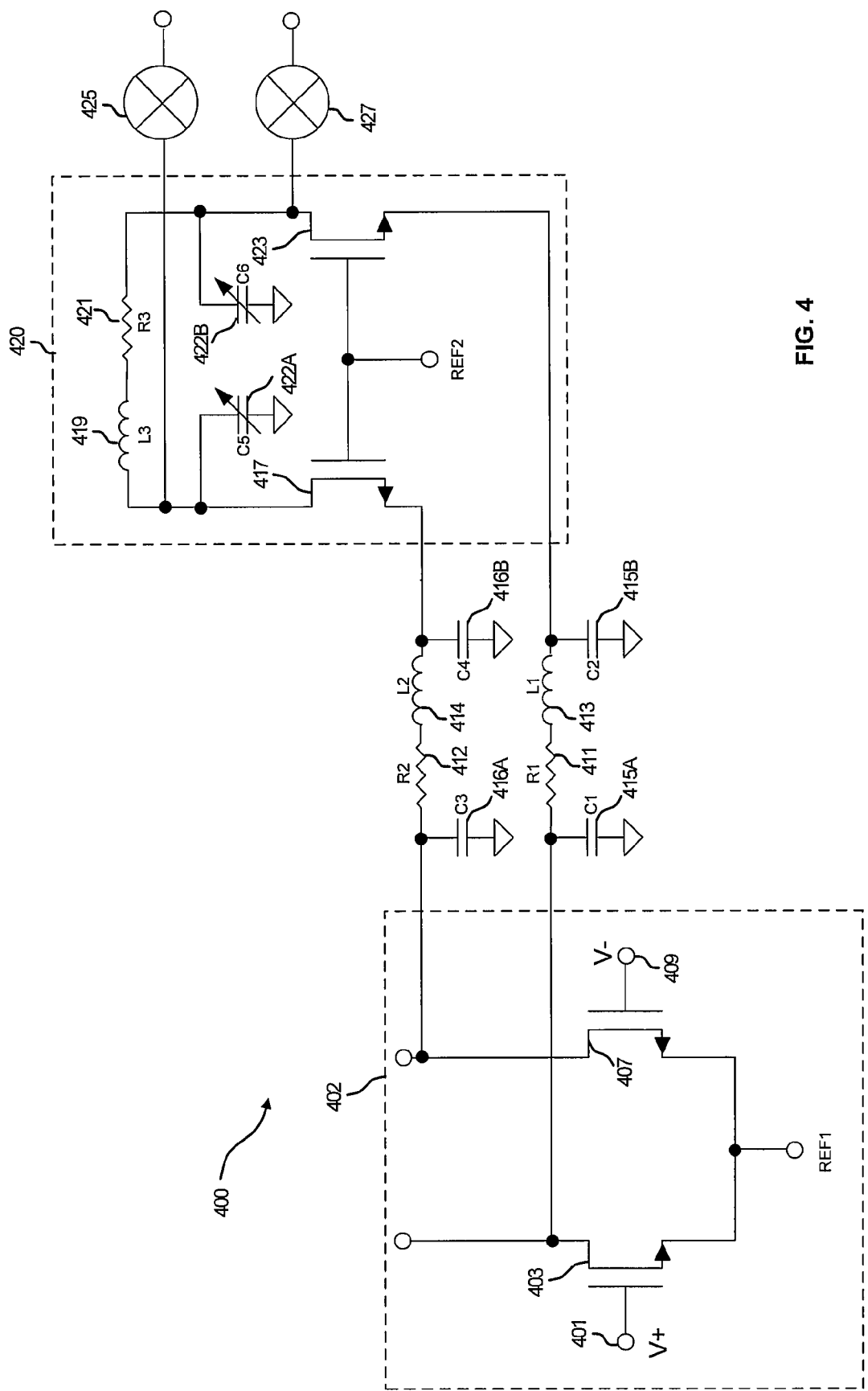
FIG. 4 is a circuit diagram illustrating an LNA transconductance amplifier, transmission line model and an LNA load for a second amplification stage for received Bluetooth signals, in accordance with an embodiment of the invention.

FIG. 4 is a circuit diagram illustrating an LNA transconductance amplifier, transmission line model and an LNA load for a second amplification stage for received Bluetooth signals, in accordance with an embodiment of the invention. Referring to FIG. 4, there is shown a second amplification stage 400 for Bluetooth signals. The second amplification stage 400 may comprise a transconductance amplifier (TCA) 402 and an BT LNA load 420. The TCA 402 may be integrated within a WLAN radio in a single WLAN and Bluetooth radio chip, such as the radio chip 302 disclosed in FIG. 3. In this regard, the TCA 402 may correspond to the TCA 315A, for example. The BT LNA load 420 may be integrated within a Bluetooth radio in a single WLAN and Bluetooth radio chip, such as the radio chip 302. In this regard, the BT LNA load 420 may correspond to the BT LNA load 315B, for example.

The TCA 402 may comprise a differential pair that utilizes transistors 403 and 407 for conversion of the differential output voltage (V) from the shared LNA 308 to a current signal that may be communicated to the BT LNA load 420. The TCA 402 may utilize a reference current (REF1) for providing the appropriate gain. The gain of the TCA 402 may be dynamically adjusted in accordance to the operations of the WLAN radio 303, for example. The parasitic components R1 411, L1 413, C1 415A, and C2 415B may correspond to an RLC pi-model of the parasitic effects that occur as a result of the connection or trace between the drain of transistor 403 in the TCA 402 and the source of transistor 423 in the BT LNA load 420. Similarly, the parasitic components R2 412, L2 414, C3 416A, and C4 416B may correspond to an RLC pi-model of the parasitic effects that occur as a result of the connection or trace between the drain of transistor 407 in the TCA 402 and the source of transistor 417 in the BT LNA load 420.

The BT LNA load 420 may comprise a differential pair that utilizes transistors 417 and 423 for conversion of the differential output current from the TCA 402 to a voltage signal that may be communicated to the mixers 425 and 427. The BT LNA load 420 may utilize an inductance (L3) 419 and a resistance (R3) 421 to achieve the current-to-voltage conversion. The BT LNA load 420 may utilize a reference signal (REF2) for providing an appropriate bias. Also shown are a variable capacitance (C5) 422A at the node driving the mixer 425 and a variable capacitance (C6) 422B at the node driving the mixer 427. The gain of the BT LNA load 420 may be dynamically adjusted in accordance with the operations of the Bluetooth radio 305, for example.

Figure 5:
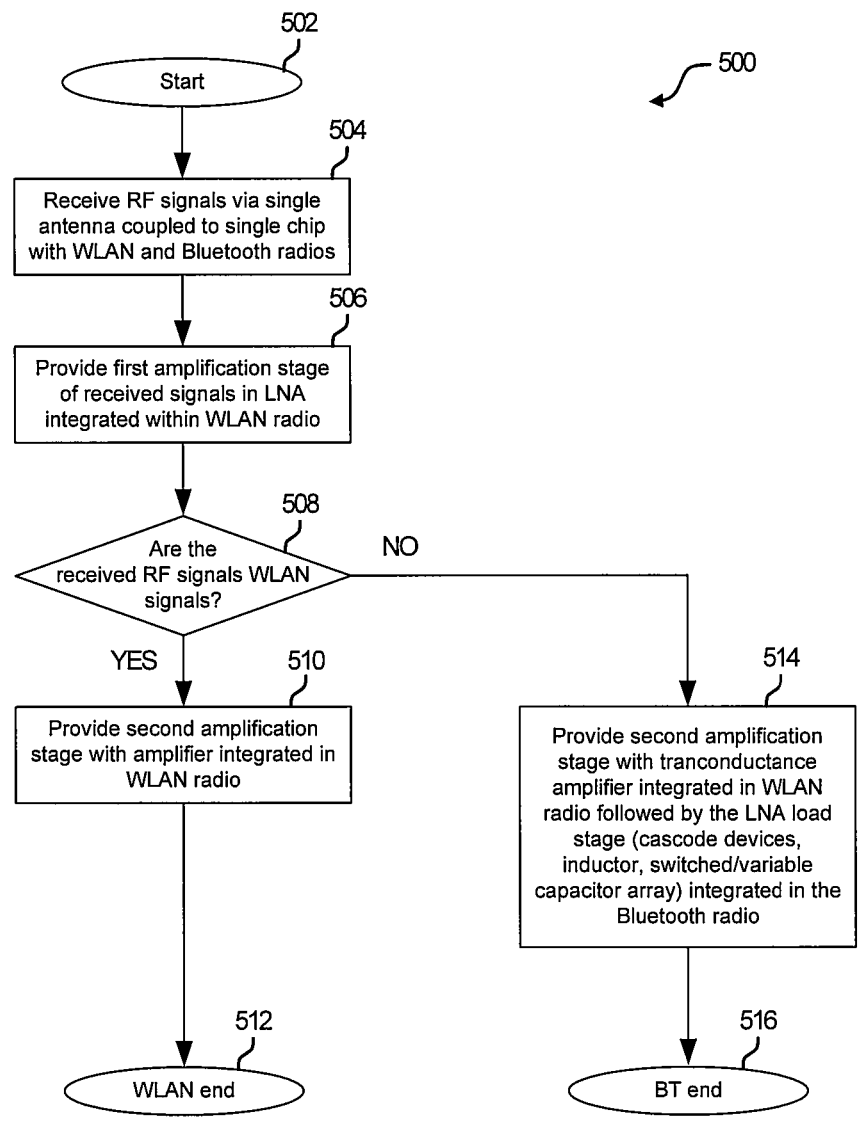
FIG. 5 is a flow diagram illustrating exemplary steps for utilizing a shared LNA circuitry for receiving WLAN and Bluetooth signals via a single antenna, in accordance with an embodiment of the invention.

FIG. 5 is a flow diagram illustrating exemplary steps for utilizing a shared LNA circuitry for receiving WLAN and Bluetooth signals via a single antenna, in accordance with an embodiment of the invention. Referring to FIG. 5, there is shown a flow diagram 500. In step 504, after start step 502, the wireless terminal 120 may receive RF signals via a single antenna. The RF signals may be WLAN signals or Bluetooth signals. The RF signals received may be communicated to a radio chip in the wireless terminal 120. The radio chip may be, for example, the radio chip 302 in FIG. 3 which comprises the WLAN radio 303 and the Bluetooth radio 305.

In step 506, the shared LNA 308 integrated within the WLAN radio 303 may be shared by both WLAN signals and Bluetooth signals to improve upon the signal strength reduction effects that occur in a parallel receiving paths configuration. In this regard, the shared LNA 308 may provide a first amplification stage for WLAN and Bluetooth signals. In step 508, when the received signals are WLAN signals, the process may proceed to step 510. In step 510, the WLAN signals may be further amplified in a second amplification stage provided by the WLAN LNA 313 in the WLAN radio 303. Further processing within the WLAN radio 303 may be provided after the WLAN signals are amplified by the WLAN LNA 313. The TCA 402 in FIG. 4 may correspond to an exemplary embodiment of the TCA 315A in FIG. 3. After step 510, the process may proceed to WLAN end step 512.

Returning to step 508, when the received signals are Bluetooth signals, the process may proceed to step 514. In step 514, the Bluetooth signals may be further amplified by a second amplification stage 312 that may comprise operations provided by the TCA 315A integrated within the WLAN radio 303 and by the BT LNA load 315B integrated within the Bluetooth radio 305. In this regard, the BT LNA load 315B may correspond to a stage comprising cascade devices, at least one inductor, and a switched/variable capacitor array, for example. Further processing within the Bluetooth radio 305 may be provided after the Bluetooth signals are amplified by the TCA 315A and BT LNA load 315B. The BT LNA load 420 in FIG. 4 may correspond to an exemplary embodiment of the BT LNA load 315B in FIG. 3. After step 514, the process may proceed to Bluetooth end step 516.

In an embodiment of the invention, a system for processing signals received via a communication medium may include a chip, such as the chip 302 in FIG. 3, that may comprise a first radio or first receiver used for processing a signal for a first wireless protocol. In this regard, the first wireless protocol may be Bluetooth and the first radio or first receiver may be a Bluetooth radio or Bluetooth receiver, such as the Bluetooth radio 305. The chip may also comprise a shared LNA, such as the shared LNA 308, for example, that enables receiving the signal for the first wireless protocol and the signal for a second wireless protocol. The chip may also comprise a transconductance amplifier, such as the TCA 315A, for example, that is utilized to couple an output of the shared LNA to the first radio or first receiver.

The shared LNA may be integrated within a second radio or second receiver in the chip used for processing the signal for the second wireless protocol. In this regard, the second wireless protocol may be WLAN and the second radio or second receiver may be a WLAN radio or WLAN receiver, such as the WLAN radio 303. Similarly, the transconductance amplifier may also be integrated within the second radio or second receiver. The chip may enable dynamic adjustment of a gain in the shared LNA.

When receiving the signal for the first wireless protocol, the chip may enable communication of the received signal from the shared LNA to a subsequent LNA load integrated within the first radio or first receiver, such as the BT LNA load 315B, for example, via the transconductance amplifier. The chip may enable dynamic adjustment of a gain in the tranconductance amplifier and subsequent LNA load integrated within the first radio or first receiver. Moreover, when receiving the signal for the second wireless protocol, the chip may enable communication of the received signal from the shared LNA to a subsequent LNA integrated within the second radio or second receiver, such as the WLAN LNA 313, for example. The chip may enable dynamic adjustment of a gain in the subsequent LNA integrated within the second radio or second receiver.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals received via a communication medium, the method comprising:
receiving, via a shared low noise amplifier (LNA) integrated within a chip, a signal for a first wireless protocol and a signal for a second wireless protocol, wherein a transconductance amplifier within said chip is directly coupled to said shared LNA and is utilized to couple an output of said shared LNA to a first radio or first receiver in said chip used for processing said signal for said first wireless protocol, and wherein a gain of said transconductance amplifier is dynamically adjusted utilizing a reference current.

2. The method according to claim 1, wherein said shared LNA is integrated within a second radio or second receiver in said chip used for processing said signal for said second wireless protocol.

3. The method according to claim 2, wherein said second radio or second receiver is a wireless local area network (WLAN) radio or WLAN receiver.

4. The method according to claim 2, wherein said transconductance amplifier is integrated within said second radio or second receiver.

5. The method according to claim 1, wherein said first wireless protocol is BLUETOOTH.

6. The method according to claim 1, wherein said second wireless protocol is WLAN.

7. The method according to claim 1, comprising dynamically adjusting a gain in said shared LNA.

8. The method according to claim 1, wherein said first radio or first receiver is a Bluetooth radio or Bluetooth receiver.

9. The method according to claim 1, comprising, when receiving said signal for said first wireless protocol, communicating said received signal from said shared LNA to a subsequent LNA load integrated within said first radio or first receiver via said transconductance amplifier.

10. The method according to claim 9, comprising dynamically adjusting a gain in said transconductance amplifier and subsequent LNA load.

11. The method according to claim 1, comprising, when receiving said signal for said second wireless protocol, communicating said received signal from said shared LNA to a subsequent LNA integrated within a second radio or second receiver in said chip used for processing said signal for said second wireless protocol.

12. The method according to claim 11, comprising dynamically adjusting a gain in said subsequent LNA integrated within said second radio or second receiver.

13. A system for processing signals received via a communication medium, the system comprising:
a chip comprising a first radio or first receiver used for processing a signal for a first wireless protocol; and
said chip comprises a shared LNA that enables receiving said signal for said first wireless protocol and a signal for a second wireless protocol, wherein a transconductance amplifier within said chip is directly coupled to said shared LNA and is utilized to couple an output of said shared LNA to said first radio or first receiver, and wherein a gain of said transconductance amplifier is dynamically adjusted utilizing a reference current.

14. The system according to claim 13, wherein said shared LNA is integrated within a second radio or second receiver in said chip used for processing said signal for said second wireless protocol.

15. The system according to claim 14, wherein said second radio or second receiver is a WLAN radio or WLAN receiver.

16. The system according to claim 14, wherein said transconductance amplifier is integrated within said second radio or second receiver.

17. The system according to claim 13, wherein said first wireless protocol is BLUETOOTH.

18. The system according to claim 13, wherein said second wireless protocol is WLAN.

19. The system according to claim 13, wherein said chip enables dynamic adjustment of a gain in said shared LNA.

20. The system according to claim 13, wherein said first radio or first receiver is a Bluetooth radio or Bluetooth receiver.

21. The system according to claim 13, wherein said chip enables, when receiving said signal for said first wireless protocol, communication of said received signal from said shared LNA to a subsequent LNA load integrated within said first radio or first receiver via said transconductance amplifier.

22. The system according to claim 21, wherein said chip enables dynamic adjustment a gain in said transconductance amplifier and subsequent LNA load.

23. The system according to claim 13, wherein said chip enables, when receiving said signal for said second wireless protocol, communication of said received signal from said shared LNA to a subsequent LNA integrated within a second radio or second receiver in said chip used for processing said signal for said second wireless protocol.

24. The system according to claim 23, wherein said chip enables dynamic adjustment of a gain in said subsequent LNA integrated within said second radio or second receiver.

25. A system, comprising:
a single chip comprising a first receiver and a second receiver, wherein:
said first receiver comprises a first low noise amplifier (LNA), a second LNA, and a transconductance amplifier, said first LNA being operable to process radio frequency (RF) signals associated with a first wireless protocol and a second wireless protocol, said second LNA being coupled to an output of said first LNA and being operable to process said RF signals associated with said first wireless protocol, and said transconductance amplifier being directly coupled to said output of said first LNA and being operable to process said RF signals associated with said second wireless protocol; and
said second receiver comprises a third LNA, said third LNA being coupled to an output of said transconductance amplifier in said first receiver and being operable to process said RF signals associated with said second wireless protocol.

* * * * *